(12) United States Patent
Chanin

(10) Patent No.: US 7,991,695 B2
(45) Date of Patent: Aug. 2, 2011

(54) INTERACTIVE FINANCIAL CARD SYSTEM UNIQUELY SUITED FOR CONDUCTING FINANCIAL TRANSACTIONS ON THE INTERNET

(76) Inventor: Harold Chanin, Boynton Beach, FL (US)

( * ) Notice: Subject to any disclaimer, the term of this patent is extended or adjusted under 35 U.S.C. 154(b) by 0 days.

(21) Appl. No.: 12/462,242

(22) Filed: Jul. 30, 2009

(65) Prior Publication Data

US 2010/0032480 A1  Feb. 11, 2010

Related U.S. Application Data

(63) Continuation-in-part of application No. 11/818,195, filed on Jun. 14, 2007, now abandoned.

(51) Int. Cl.
*G06Q 40/00* (2006.01)
(52) U.S. Cl. .......................................... 705/42
(58) Field of Classification Search ...................... 705/42
See application file for complete search history.

(56) References Cited

U.S. PATENT DOCUMENTS

| | | | | |
|---|---|---|---|---|
| 5,793,952 | A * | 8/1998 | Limsico ........................... | 726/18 |
| 6,282,522 | B1 * | 8/2001 | Davis et al. ....................... | 705/41 |
| 6,839,692 | B2 * | 1/2005 | Carrott et al. .................... | 705/64 |
| 2007/0078785 | A1 * | 4/2007 | Bush et al. ...................... | 705/72 |

OTHER PUBLICATIONS

James Perry, "From control to collaboration . . . Finance Shifts its Focus", pp. 22-26, v22n4, Aug. 2006, ISSN: 0883-7856.*
Conrad, Lee, "Power, Progress and Public Responsibility", US Banker, 116, 5, 35; May 2006, ISSN: 0148-8848.*
Masuda, Barry, "Card Fraud: Discover the Possibilities", v36n12, pp. 71-74, Dec. 1992, ISSN: 0145-9406.*

* cited by examiner

*Primary Examiner* — Alexander Kalinowski
*Assistant Examiner* — Edward Chang
(74) *Attorney, Agent, or Firm* — Robert M. Downey, P.A.

(57) ABSTRACT

A system and method for conducting secured online financial transactions on the Internet provides an electronically readable e-commerce card issued by a financial institution, as well as an electronic card reading device that communicates with the card owner's computer. To enable an online financial transaction on the Internet, the e-commerce card must first be read by the electronic card reading device. Next, the card owner is required to input a security code, and possibly other personal security information, that is known only by the user to the exclusion of others, including the card issuer. This system and method effectively decentralizes the personal security codes and other security information of all e-commerce card owners using the system, thereby substantially reducing the likelihood and extent of fraud and theft stemming from the traditional financial card (e.g., credit card and debit card) system without altering the framework of the existing global Internet marketplace and it's supporting e-commerce networks and systems.

2 Claims, 6 Drawing Sheets

INTERACTIVE FINANCIAL CARD SYSTEM UNIQUELY SUITED FOR CONDUCTING FINANCIAL TRANSACTIONS ON THE INTERNET

This application is a Continuation-In-Part Application of patent application Ser. No. 11/818,195 filed on Jun. 14, 2007 now abandoned.

BACKGROUND OF INVENTION

1. Field of the Invention

This invention relates to e-commerce and, more particularly, to a more secure method and system for authenticating a user prior to entering the global Internet marketplace and enabling a financial transaction. The system combines an Internet-unique financial card with an electronic card reading device that communicates with a user's computer, and decentralizes each card owner's personal security data to thereby reduce the likelihood and extent of criminal e-commerce fraud and theft.

2. Discussion of the Related Art

Traditional financial cards (e.g., credit cards and debit cards) were developed, introduced, and utilized in the 1920s, long before the advent of the global computer network known as the Internet and the resultant e-commerce marketplace system. The inclusion of particular personal identification information of financial card owners on traditional financial cards, such as unique identification numbers and information related to the card issuer, stem from their evolving origins as financial instruments that were intended to primarily serve face-to-face business transactions. Traditional financial cards have further evolved to include an embedded magnetic strip to retain and transfer personal and business data, including the card owner's financial account number and full name, the expiration date, and other discretionary date, through suitable reading/transmission devices, which electronically support, validate, and serve financial transactions. Traditional financial cards are currently used in conjunction with the global Internet marketplace, and serve as a primary method of making financial transactions using one's personal computer.

Criminal e-commerce fraud and theft is an ongoing problem hindering the advancement of the global Internet marketplace. Traditional "hacking" of computers remains prevalent, as is a relatively new form of criminal e-commerce fraud, known as "phishing," wherein an individual is tricked into revealing personal information, including his or her password. A constant struggle exists between these very costly criminal problems and the subsequent implementation of new security measures, which yields additional costs in itself. The global Internet marketplace is structured such that information related to personal identity matters is under the centralized purview and control of the issuers of financial cards and global e-commerce merchants. This centralized storage of valuable information provides the inclined criminal the necessary enticement to perform the criminal act of e-commerce fraud and theft.

In response, many systems for securing user's data have been developed in an attempt to stymie e-commerce fraud and theft. Generally, these systems involve varied validation processes, which occur over the Internet, that are intended to ensure the user's identity. The most generic of such validation processes is the username/password system, which requires the user to provide a predetermined username and password coupling before being granted access to the particular website. More advanced validation processes relying on certain biometric characteristics such as voice analysis, fingerprint scanning, and DNA analysis have been further implemented.

Each of these validation processes have two particular commonalities, however, which impede the pursuit for a safe and secure global Internet marketplace. First, where the user makes a purchase in the global Internet marketplace, the user provides information linked to a traditional financial card, such as a credit card or debit card, the data from which can be used to make any number of fraudulent purchases at any given place and time, whether on the internet or over the telephone. And second, the data used to validate each individual user is secured in a centralized location, which must be accessed over the Internet. Such a centralized security location, regardless of the measures being taken to secure the information, provokes the criminal act of e-commerce fraud and theft.

The primary and pivotal enabler for much of the electronic-based crimes remains the basic technological incompatibilities between the traditional financial card systems and Internet e-commerce systems. Therefore, related criminal activities cannot be readily and cost-effectively resolved without a fundamental paradigm shift for an enhanced secure global Internet marketplace.

Accordingly, there remains a need for a more secure system and method of conducting e-commerce Internet business operations, in which an interactive Internet-unique financial card system is utilized, wherein each such financial card is de-coupled from the traditional standards and specifications, and further designed for fully secured integration with adapted computers and the like, including various desktops and laptops employing telephonic, cabled, and wireless interconnection within the global computer network. Rather than altering the framework of Internet e-commerce business systems to be more securely compatible with the traditional financial card system, the system and method herein employ the utility of Internet-unique financial cards and an operational system that are adapted for use within the established framework of current Internet e-commerce transactions for the purpose of significantly reducing e-commerce fraud and theft.

SUMMARY OF THE INVENTION

The present invention is directed to an interactive Internet-unique financial card system designed to ensure the integrity of secured e-commerce Internet business operations. The fundamental concept, utility, and application of the interactive financial card operating system, employing any of the many fundamental embodiments, is the paradigm shift and modification of the traditional financial card architecture, protocol, and procedure to effectively and securely serve within the constraints and limitations of the modern Internet e-commerce marketplace, its financial networks, and its operating systems.

According to one embodiment of the invention, a financial institution issues each customer (i.e "card owner") an Internet-unique financial card (hereinafter "e-commerce card" or "card"). This e-commerce card is similar in nature to the physical attributes of a traditional financial card. Each card is adapted to be used solely in conjunction with the card owner's personal computer to conduct an e-commerce financial transaction. Furthermore, each card, as part of its novel secured design, contains no visible or readable name, expiration date, identification number, or any other readily identifiable markings related to the card owner. Consequently, to unlawfully possess such a card is to possess an item of no intrinsic value, as it contains no user-identifying markings and can only be used in conjunction with an adapted computer.

The electronically readable portion of the card, such as a magnetic strip or a digital readout, requires the use of a suitably adapted computer with a corresponding electronic reading device. Upon reading of the card, the computer requires the user to input a security code known only by the card owner to the exclusion of others, including the card issuer. This security code, and possibly other personal security information (e.g., a series of personal questions and answers that are scripted by the individual card owner), is stored only within the personal computer of the card owner and can be changed after every use, as an additional security measure, at the discretion of the card owner. After the e-commerce card has been read and the security code has been successfully entered and matched with the security code stored on the card owner's computer, the card owner's computer communicates with the financial institution over the internet, notifying it of the ensuing transaction. The financial institution then identifies the user to be the card owner and authorizes a transaction in the amount requested. The card owner, after completing all steps required by the interactive Internet-unique financial card system, can finalize the purchase of goods and/or services on the global Internet marketplace. Upon completion of the transaction, the card issuer is notified of the transaction and can subsequently send a bill to the card owner or debit the transaction amount from a financial account of the card owner.

BRIEF DESCRIPTION OF THE DRAWINGS

For a fuller understanding of the nature of the present invention, reference should be made to the following detailed description taken in conjunction with the accompanying drawings in which.

DETAILED DESCRIPTION OF THE PREFERRED EMBODIMENTS

Referring to the several views of the drawings, the interactive Internet-unique financial card system of the present invention is shown and generally indicated as 10. Combating the very costly criminal problem of electronic theft requires a major business and operational paradigm shift, one which serves the Internet's electronic financial marketplace rather than the nearly insurmountable alternative of reconstructing Internet e-commerce business systems to eventually become compatible with the constraints and limitations imposed by traditional financial cards. The fundamental methodology and utility of the interactive Internet-unique financial card system 10 effectively resolves these longstanding technological incompatibilities, including the divergent characteristics, properties, attributes, and protocols existing between the traditional financial cards system and the global Internet e-commerce business networks and their operational systems.

Figure 1:
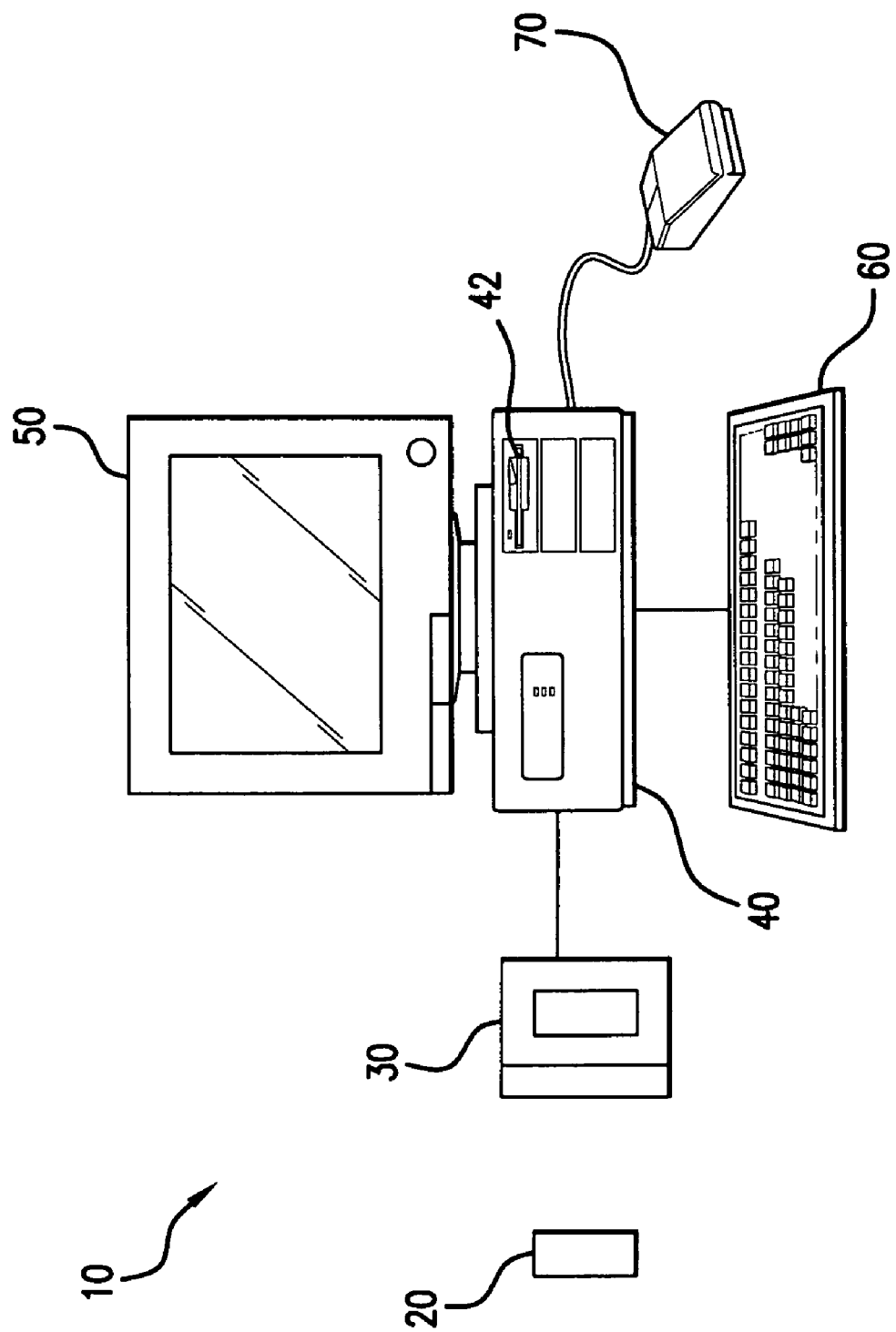
FIG. 1 is a front view showing the interactive Internet-unique financial card system of the present invention, in accordance with a preferred embodiment, and including an adapted computer with a monitor, keyboard, and mouse, an e-commerce card, and an accompanying card reading device.

In a first embodiment illustrated in FIG. 1, an e-commerce card 20 and an electronic card reading device 30 are shown with a personal computer 40 coupled to a computer monitor 50, a keyboard 60, and a mouse 70. The physical attributes of a first embodiment of the e-commerce card 20 are similar in nature to the physical attributes of traditional financial cards. Inherent in the utility of the e-commerce card 20 is the lack of any readily identifiable markings typically found on a traditional financial card, such as the card owner's name, an account number, or an expiration date. Therefore, unlike with traditional financial cards, any individual other than the card owner who unlawfully comes into possession of an e-commerce card 20 win possess an item of no beneficial or financial utility.

Figure 2:
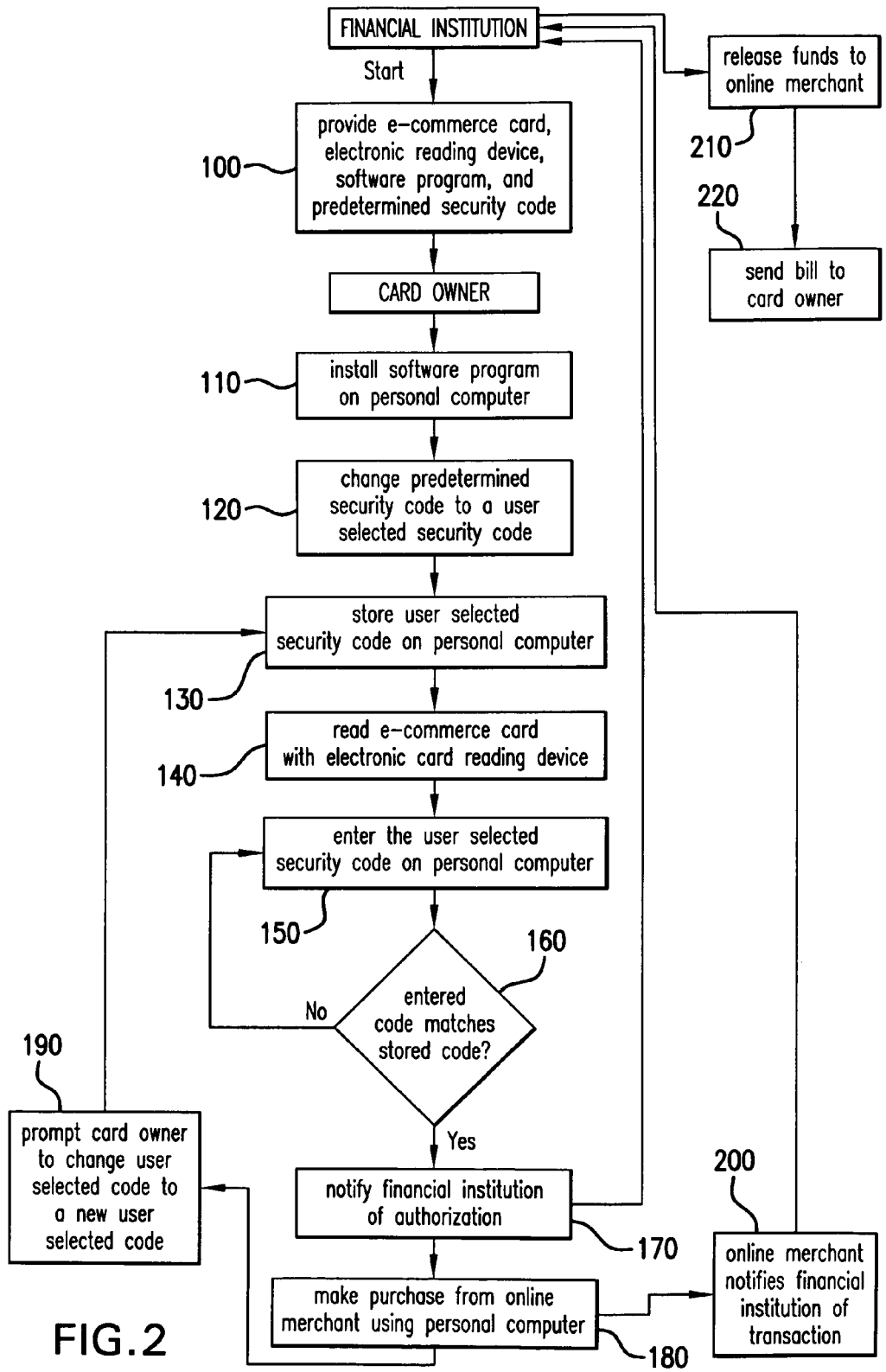
FIG. 2 is a flowchart depicting the method for conducting online financial transactions using the interactive Internet-unique financial card system of the present invention, detailing the step-by-step process.

The interactive Internet-unique financial card system 10, as detailed by the flowchart in FIG. 2, provides a system and method for making secured online financial transactions on the global computer network. First, a financial institution provides a card owner with the e-commerce card 20, the electronic reading device 30, a software program, and a predetermined security code, as indicated at 100. Upon installing the software program at step 110, the card owner is then prompted to enter the predetermined security code. After the card owner enters the predetermined security code and the software program matches the entered security code with the stored security code, the software prompts the card owner to change the security code by entering a user selected security code, and possibly other security information, that is known only by the user to the exclusion of others, as shown at 120. Even the card issuing financial institution will not have access to the user selected security code, which is stored solely within the card owner's personal computer 40, as indicated by step 130. This characteristic of the present invention effectively decentralizes the personal security codes and other security information of all e-commerce card 20 owners using the system 10, thereby substantially reducing the likelihood and extent of criminal e-commerce fraud and theft stemming from the traditional financial card system.

To enable an online financial transaction on the global computer network, the electronically readable e-commerce card 20 obtained from the financial institution must first be read by the electronic reading device 30 that is in communication with the card owner's personal computer 40, as shown at 140.

After the e-commerce card 20 has been read by the electronic reading device 30, a window on the computer monitor 50 will open, requiring the card owner to enter the user selected security code, as indicated by step 150. The software program then determines whether the entered security code matches the user selected security code that is stored on the card owner's computer 40 at 160. If the two security codes do not match, then the user is again prompted to enter the user selected security code. If the two security codes do match, then the user is allowed to enter the global computer network.

In an alternative embodiment, the security code feature of the present invention 10, uses an automated random alpha-numeric code generator that generates a unique alpha-numeric security code each time the card owner's e-commerce card 20 is read by the electronic reading device 30. In order to enter the global computer network, the card owner must enter the computer generated code into the security code field. Consequently, where this embodiment is employed, it is unnecessary for the card owner to remember any user selected security code, but the security code is still stored solely on the card owner's computer 40.

After the card owner's computer 40 has connected to the global computer network, it will communicate with the card issuer's computer that a financial transaction is imminent, as shown at 170. From there, at step 180, the card owner can make online financial transactions in a manner consistent with current practice. The card owner will enter all required information (e.g., name, account number, expiration date, security code, and address) that has been supplied by the card issuer by means other than displaying the information on the e-commerce card 20 itself.

As an additional security feature shown at 190, the software program will prompt the card owner to change the user selected security code, and possibly other security information, after each financial transaction. Such changes of the user selected security code are stored solely on the user's computer 40, and further ensure secured financial transactions on the global computer network.

After the finalization of each online financial transaction, the financial institution is notified of the transaction by the online merchant from which the financial transaction was made, as indicated at 200, and the financial institution subsequently sends the necessary funds to the online merchant at 210. The financial institution periodically sends a bill to the card owner or debits the total transaction amount or a predetermined amount from the card owner's banking institution, as shown at 220.

Figure 3:
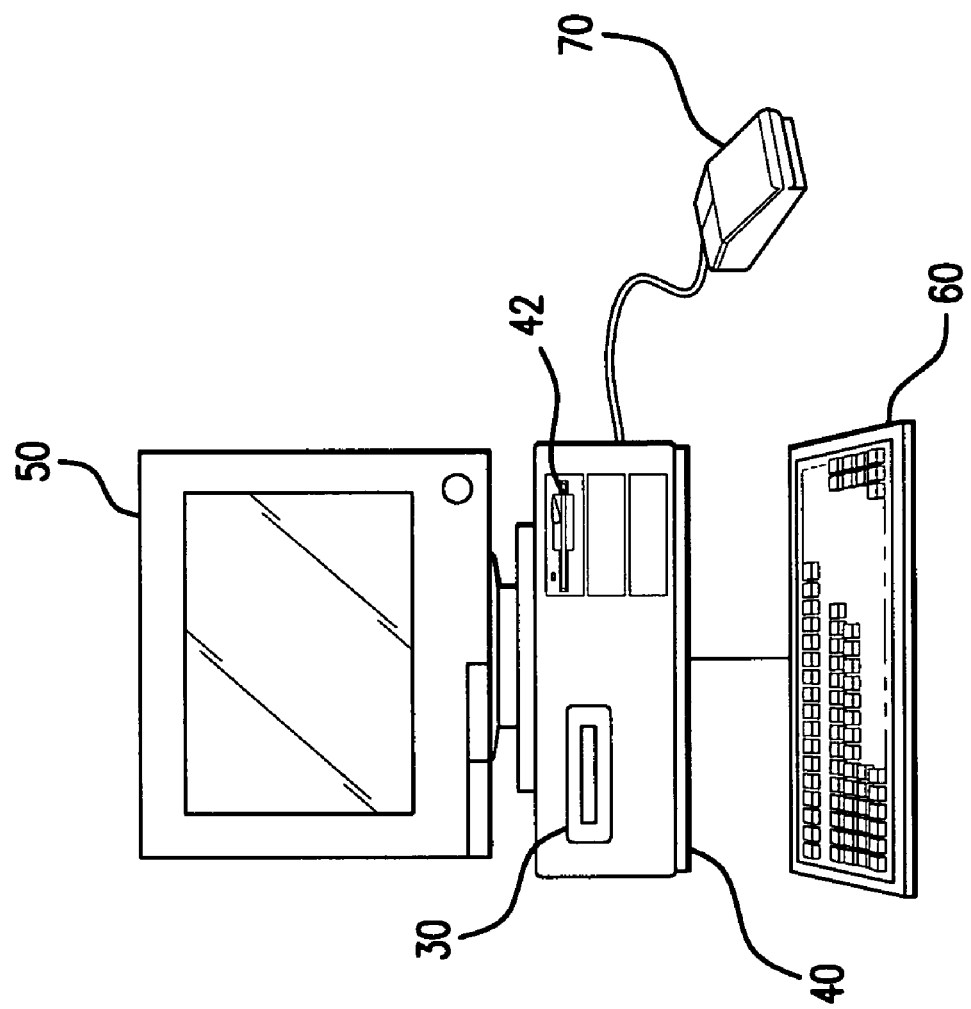
FIG. 3 is a front view showing the interactive Internet-unique financial card system of the present invention, in accordance with a preferred embodiment, and including an adapted computer having an internal electronic card reading device with a monitor, keyboard, and mouse, and an e-commerce card.
Figure 3:
Figure 4:
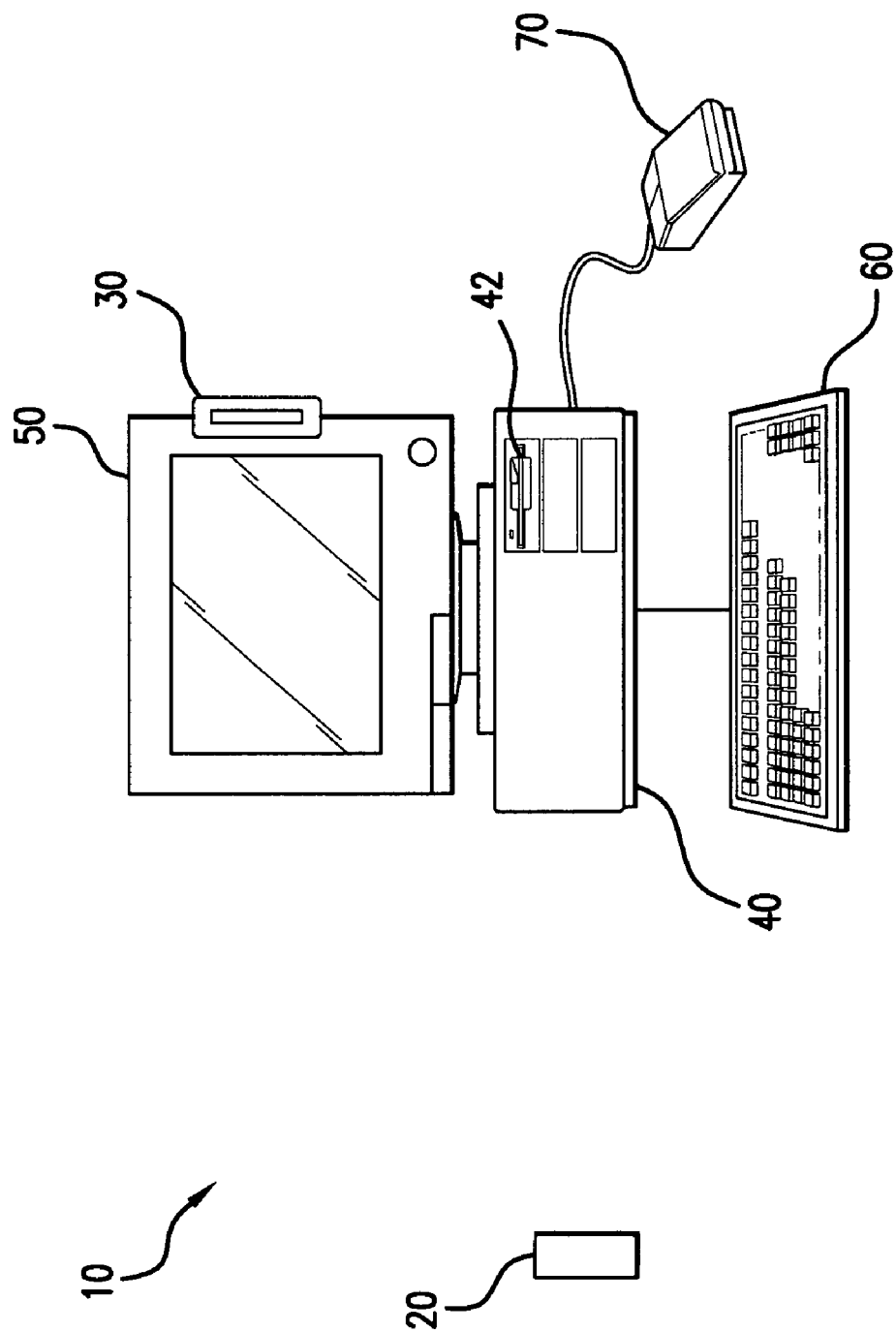
FIG. 4 is a front view showing the interactive Internet-unique financial card system of the present invention, in accordance with a preferred embodiment, and including an adapted computer with a monitor having an electronic card reading device, keyboard, and mouse, and an e-commerce card.
Figure 5:
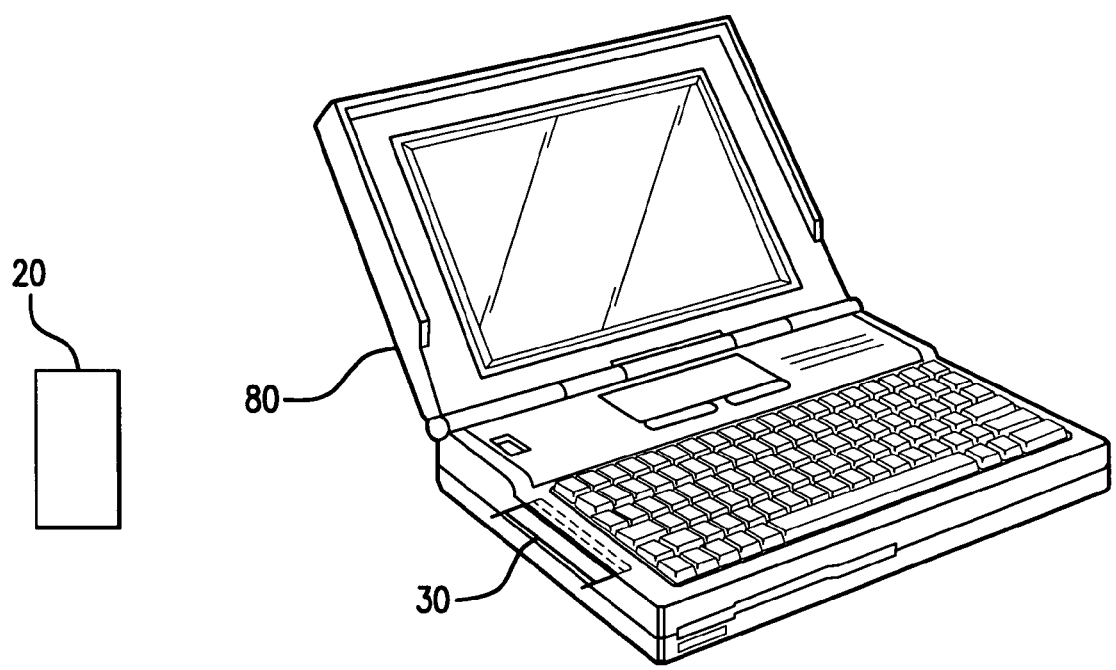
FIG. 5 is a front view showing the interactive Internet-unique financial card system of the present invention, in accordance with a preferred embodiment, and including a laptop computer having an internal electronic card reading device and an e-commerce card.
Figure 6:
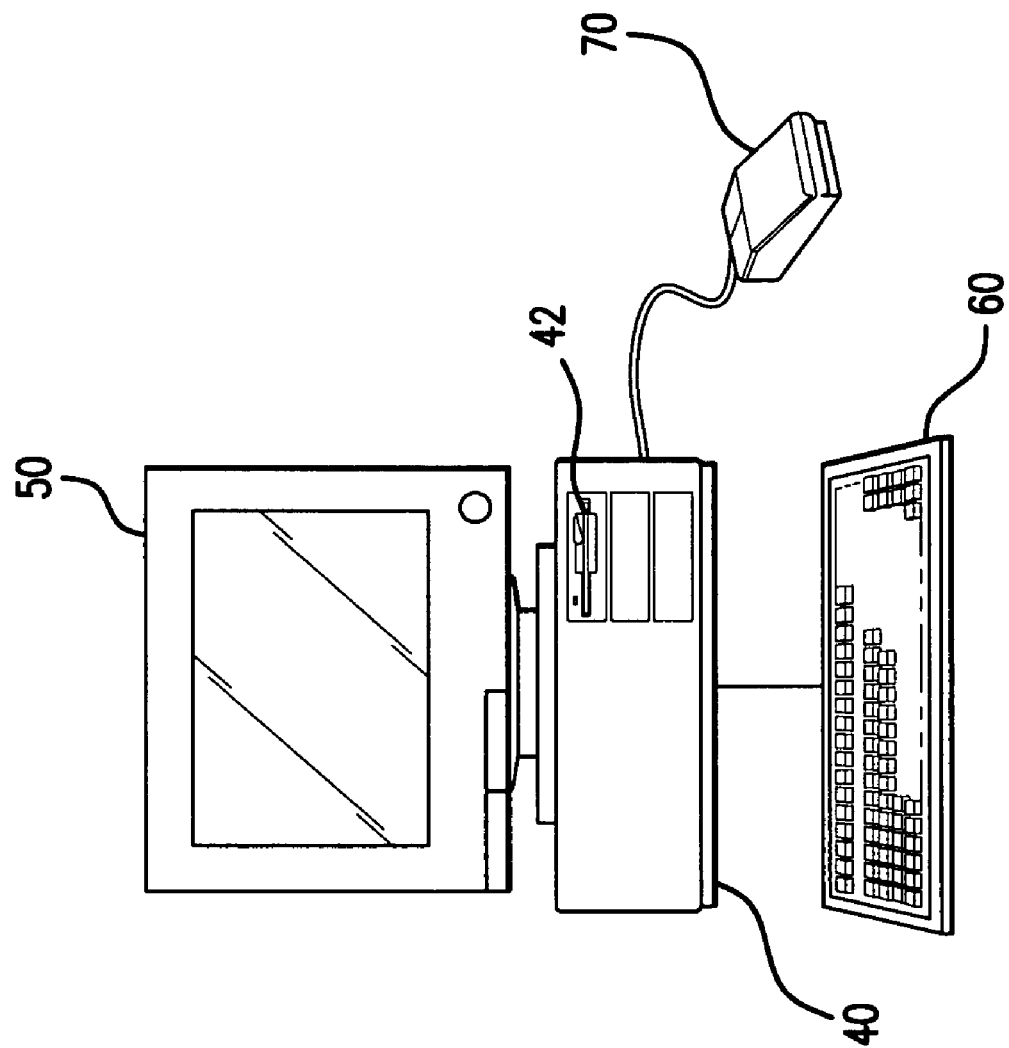
FIG. 6 is a front view showing the interactive Internet-unique financial card system of the present invention, in accordance with a preferred embodiment, and including an adapted computer with a monitor, keyboard, and mouse, and an e-commerce compact disc card.
Figure 6:
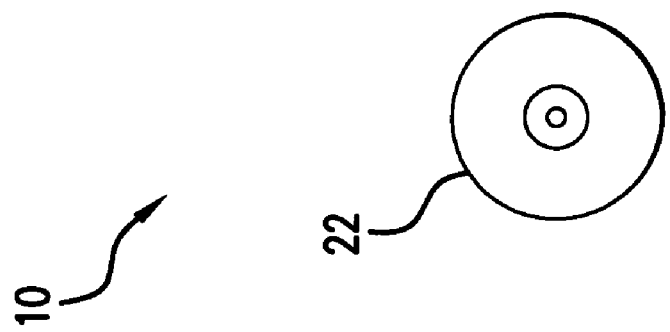

Several different embodiments of the e-commerce card 20 and the electronic card reading device have been considered. In the first embodiment, as described above and shown in FIG. 1, the e-commerce card 20 includes a magnetic strip 22, which enables the electronic reading device 30 to identify the particular e-commerce card. Additionally, the electronic card reading device 30 could be located on the card owner's computer 40 or computer monitor 50 as shown in FIGS. 3 and 4, respectively. Where the card owner utilizes a laptop 80 to make online financial transactions, the electronic card reading device 30 could be located on the laptop 80, as shown in FIG. 5. In a further embodiment of the e-commerce card, the e-commerce card is in the form of an e-commerce compact disc (CD) 22 that can be read by a standard CD drive 42 in the user's personal computer 40, as shown in FIG. 6.

A further embodiment of the interactive Internet-unique financial card system 10 is its utilization within a network of adapted remote computers in communication with the card owner's personal computer 40. In this instance, an electronic card reading device at a remote location reads the user's e-commerce card 20. A computer in communication with the electronic card reading device and the card owner's personal computer 40 prompts the card owner to input the user unique security code that is stored exclusively on the card owner's computer after the e-commerce card 20 has been read by the reading device 30. At this point, the card owner can make an online financial transaction in the same manner as described above.

What is claimed is:

1. A system for conducting online financial transactions on a global computer network, said system comprising:
   a financial card issued by a financial institution to an authorized card owner, said financial card having electronically readable data specific to the particular authorized card owner electronically stored thereon, and said financial card having no visible card owner information thereon, including no visible card owner name, no visible account number and no visible expiration date;
   an electronic card reading device for conducting financial transactions, and said electronic card reading device communicating with the card owner's computer, and said financial card reading device being structured and disposed for reading the electronically readable data stored on the financial card, and said electronic reading device being further structured and disposed for transmitting the electronically readable data to the card owner's computer; and
   a software program for installation on the card owner's computer and being structured and disposed for comprehending said electronically readable data read from said financial card, said software program being further structured and disposed for storing a card owner selected security code exclusively on the card owner's computer, to thereby establish a plurality of decentralized databases of card owner security codes throughout the system, wherein each card owner's security code is stored only on their computer, said software program being further structured and disposed for prompting the card owner to enter the card owner security code prior to making a financial transaction on the global computer network, said software program being further structured and disposed for comparing the entered card owner security code with the stored card owner selected security code and for communicating with said financial institution to enable the financial transaction upon determining that the entered card owner security code matches the stored card owner selected security code stored on the card owner's computer, and said software program being further structured and disposed for prompting the card owner to change the card owner selected security code after making the financial transaction.

2. The system as recited in claim 1 wherein said financial card is a compact disc (CD).

* * * * *